United States Patent [19]
Rowland-Hill

[15] 3,648,710
[45] Mar. 14, 1972

[54] CROP FEEDING MEANS TO AN AXIAL FLOW TYPE THRESHING AND SEPARATING COMBINE

[72] Inventor: Edward William Rowland-Hill, Lancaster, Pa.
[73] Assignee: Sperry Rand Corporation, New Holland, Pa.
[22] Filed: June 30, 1970
[21] Appl. No.: 51,254

Related U.S. Application Data

[63] Continuation of Ser. No. 790,145, Jan. 9, 1969, and a continuation of Ser. No. 879,214, Nov. 24, 1969.

[52] U.S. Cl. ........................................................130/27 T
[51] Int. Cl. .........................................................A01f 12/10
[58] Field of Search..................................130/27 T, 27 R, 23

[56] References Cited

UNITED STATES PATENTS 3,464,419   9/1969   Knapp et al............................130/27 T
3,537,460   11/1970  Van Buskirk...........................130/27 T
3,481,343   12/1969  Van Buskirk...........................130/27 T Primary Examiner—Antonio F. Guida
Attorney—Joseph A. Brown, John C. Thompson, James J. Kennedy and George C. Bower

[57] ABSTRACT

An axial flow threshing and separating unit of an agricultural combine has angled transport fins mounted on the inner side of the top of the casing to move crop material carried over the top of the auger flights on the rotor in the casing into the following threshing and separating means of the unit.

2 Claims, 4 Drawing Figures

Patented March 14, 1972  3,648,710
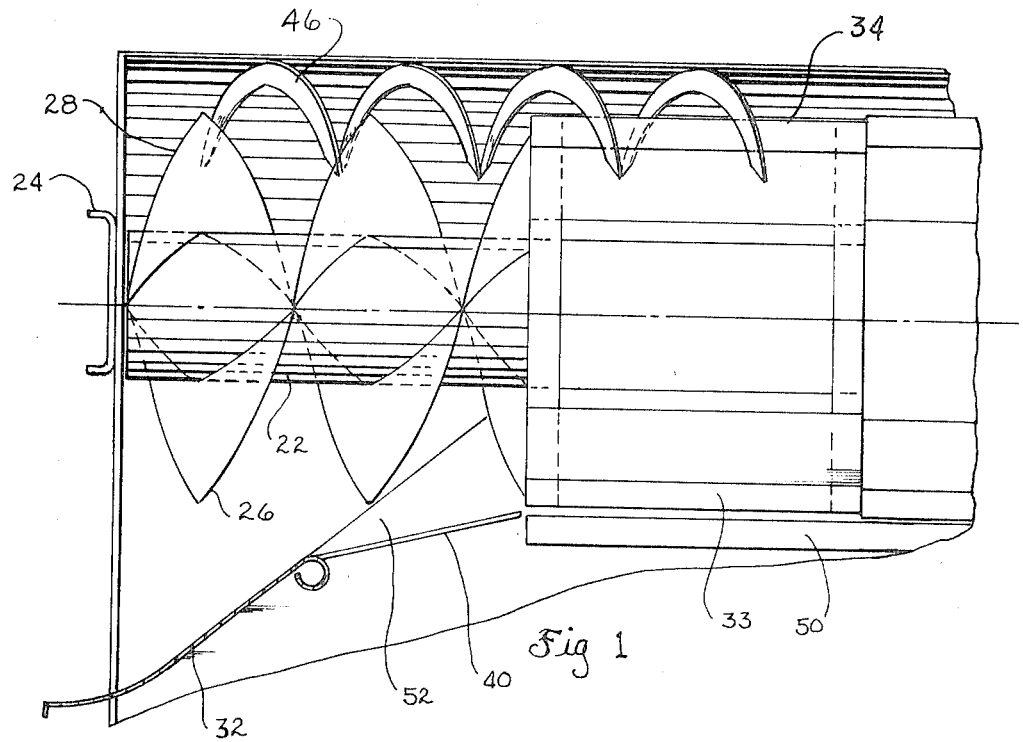
Fig 1
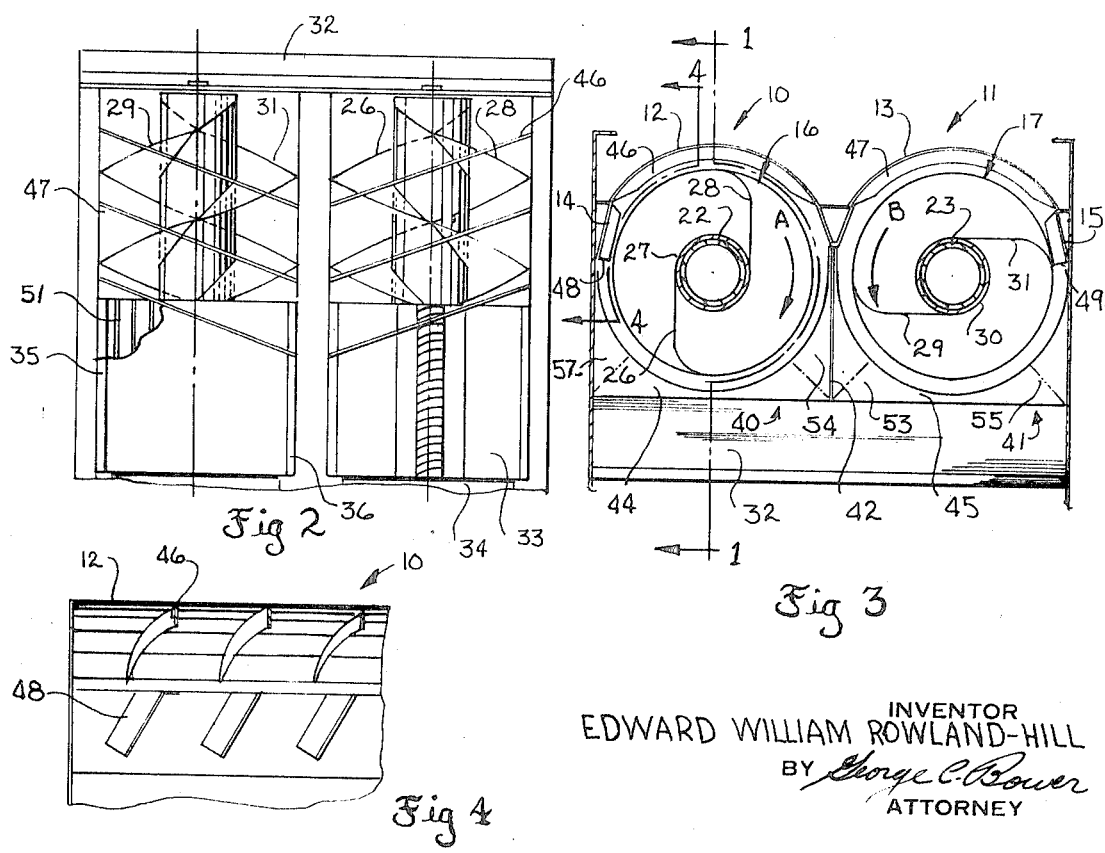
Fig 2
Fig 3
Fig 4
INVENTOR
EDWARD WILLIAM ROWLAND-HILL
BY George C. Bower
ATTORNEY 3,648,710

CROP FEEDING MEANS TO AN AXIAL FLOW TYPE THRESHING AND SEPARATING COMBINE

RELATED APPLICATIONS

This is in part a continuation of my U.S. Pat. applications Ser. No. 790,145, filed on Jan. 9, 1969, and entitled "An Axial Flow Threshing and Separating Machine", and Ser. No. 879,214 filed on Nov. 24, 1969, and entitled "Means for Feeding Crop Material to an Axial Flow Type Threshing and Separating Combine".

BACKGROUND OF THE INVENTION

This invention relates to axial flow type combines and is directed particularly to the feeding of the crop material to the threshing and separating means.

As described in the aforementioned patent applications, an axial flow type combine has a generally cylindrical casing and a rotor within the casing. The casing has a top casing wall, opposite side walls, concave and grate. The rotor has rasp bars forming a threshing and separating means with the concave and has blades forming a separating means with the grate. A feed auger is in the front of the casing and mounted on the axially extending rotor for delivering crop material to the threshing and separating means. The forward part of the casing has ramp means extending upwardly for delivery of crop material upwardly into the intermediate portion of the auger. The auger transports the crop material into the threshing and separating means.

One of the advantages of the axial flow combines as described in the aforementioned applications is the rapid transport of crop material through the combine. Crop material passes through these combines in a third of the time that crop material passes through conventional transverse combine with straw walkers. Although the crop feeding means described in the U.S. Pat. application Ser. No. 879,214 operates quite satisfactorily and rapidly transports material through the combine, a plugging complication occasionally occurs at the function of the feed augers and the threshing and separating means.

The large combine headers can cut and feed crop material to the combine faster than the combine can properly thresh and separate the material. The axial flow combine substantially improves the relation between the header supply and the combine transport of the crop material to permit larger headers to be used. However, on occasions and in some crops, crop material can be fed to the axial combine as described in U.S. Pat. application Ser. No. 879,214 to rapidly cause congestion or plugging of crop material. This plug of material rotates with the auger and rotor to prevent further adequate feeding of crop material.

It is the purpose of this invention to increase the rate of feeding of crop material by the auger, to more rapidly pass crop material through the combine and prevent plugging of the rotor.

SUMMARY AND OBJECTS OF THE INVENTION

An object of this invention is to further improve the feeding of crop material by augers to threshing and separating sections.

Another object of this invention is to rapidly feed crop material without congestion of the crop material at the entrance to the threshing and separating means.

Another object of the invention is to increase the rate of feed of crop material by the auger to the threshing and separating means.

In summary the crop feeding means includes, in addition to ramp means feeding the crop material upwardly and intermediately into the feed augers, transport fins means in the top of the casing to axially advance crop material that is carried over the top of the auger into the threshing and separating means.

Other and further objects and advantages of this invention will be apparent from the following description and claims taken in connection with the accompanying drawings which illustrate the various features of this invention.

BRIEF DESCRIPTIONS OF THE DRAWINGS

FIG. 1 is a sectional view of the right threshing and separating unit of the axial flow combine taken along lines 1—1 of FIG. 3.

FIG. 2 is a top view of the rotors of the two threshing and separating units with the top wall of the casing removed.

FIG. 3 is a front view of the threshing and separating units.

FIG. 4 is a fragmentary view of the inner side of the casing of the right threshing and separating unit taken along lines 4—4 of FIG. 3.

DETAILED DESCRIPTION OF THE PREFERRED EMBODIMENT

The drawings illustrate the feeding means and rotors of an axial flow type combine with two threshing and separating units. The axial separating means following the respective threshing and separating means are not illustrated. The terms "right" and "left" are used in viewing of the units from the rear towards the front.

The two threshing and separating units 10 and 11 comprise top walls 12 and 13, side plates 14 and 15 and rotors 16 and 17. The rotors are mounted on shafts 22 and 23 which are rotatably mounted in transverse support beams 24 at the front and rear of the combine and rotatably driven at the rear in opposite directions as indicated by the arrows A and B on FIG. 3. Two auger flights 26 and 28 are mounted on a sleeve or tubular member 27 pinned to the shaft 22 to rotate therewith. Auger flights 29 and 31 are mounted on the tubular member 30 pinned to the shaft 23 to rotate therewith.

The rotors at the threshing and separating sections have an elliptical or oval shape and extend diametrically from the shafts 22 and 23 to support the rasp bars 33, 34, 35 and 36 along respective longitudinally extending opposite edges.

The harvested crop is fed to the respective threshing and separating rotors by the augers 26, 28, 29 and 31. The two auger flights deliver harvested crops to the respective threshing bars of a given rotor. The harvested crop material is fed by a crop elevator across the width of the two threshing and separating units. The auger flights 26, 28, 29 and 31 have about 1½ turns between the front of the combine and the threshing and separating means. The harvested crop material from the crop elevator is delivered as seen in FIG. 3 upwardly along the ramp 32. The ramp extends inwardly from the front of the casings of the units 10 and 11. The forward portion of the ramp is spaced downwardly from the shafts 22 and 23 and from the outer edges of the auger flights 26, 28, 29 and 31. This provides an opening between the outer edges of the auger flights and the ramp for the harvested crop to pass along the ramp underneath the auger flights and upwardly to deliver the crop material in a rearward and radial direction at approximately half a turn of the auger flight from the front of the casing. This will feed the harvested crop in a general radial direction in between the turns of the auger flights.

The threshing and separating units have transition members 40 and 41 extending rearwardly from the ramp to the threshing and separating means. The transition members 40 and 41 have planar portions 44,45 narrowing from the rear edge of the ramp to the concaves 50,51. The side surfaces 52, 54 and 53,55 of the transition members curve into generally circular edges at the threshing and separating means as shown in FIG. 3. Harvested crops moved up the ramp and separated equally between the threshing and separating units by the transition members 40 and 41 and the sloped divider edge 42 formed by the adjacent curved surfaces at the adjacent side of the unit. The rotating flights carry the crop material along the transition members into the threshing and separating means in advance of the rasp bars at the respective termination of the flights. The top walls 12 and 13 have flight 46 and 47 respectively. The flights are curved to wrap or extend partially around the auger flights as illustrated in FIG. 3 in connection with the right unit 10. The vane flights are also at an angle to the axis of the shafts 22 and 23 and sloped in the direction of feed of the auger flights. The side plates 14 and 15 have shorter flights 48,49 on the side plates 14 and 15. The plates 14 and 15 are positioned between the lower outer edge of the top walls 12 and 13 downwardly to the side walls of the casings above the axis of the shafts 22 and 23. The short flights 48,49 are sloped in the same direction as the top wall flights 46,47 with the upper ends tilted rearwardly in relation to the lower end.

Harvested crop entering into the auger flights from the ramp, in addition to being moved along the transition members 40,41 by the auger flights, are carried up and over the top of the shafts 22 and 23 into the upper portion of the casings. The flights 48 and 46 and 49 and 47 deflect this carried-over harvested crop forwardly along the shaft toward the threshing and separating means. Thus the crop that is carried over the shaft is projected rearwardly and fed into the threshing and separating means of each of the units.

The fins increase the speed or rate of material fed to the crop of the casing. The threshing and separating rotors move downwardly at the center on rotation. The feed from the auger flights and vane flights on the cylindrical top wall of the casing direct crop material flows along the bottom of the casing to the transition members as well as along the top of the casing. This continuous even delivery of crop material to the threshing section at both the top and bottom provides for a rapid through-put of crop material. With the vane flights, the crop material is not carried around by the flights, but is forced axially into the threshing and separating means. The higher rate of input from the vane flights and auger flights into the threshing and separating means increases the input to the threshing and separating means and thus increases the threshing capacity, the amount of crop material processed and the through-put speed. By increasing the amount of crops threshed the overall capacity of the combines is increased.

The rearward force of the vane flights and the rearward force of the auger flights provides continuously delivery of the crop material to the threshing and separating means, prevents the plugging of the crop material and the restriction of the rearward movement. This continuous feed and prevention of accumulation of feed maintains the rotors free to deliver the material to the threshing and separating means at a continuous rapid rate.

While the invention has been described in connection with a particular embodiment thereof, it will be understood that it is capable of further modifications, and this application is intended to cover any variations, uses or adaptations of the invention following, in general, the principles of the invention including such departures from the present disclosure as come within known or customary practices in the art to which the invention pertains, and as may be applied to the essential features hereinbefore set forth, and as fall within the scope of the invention or the limits of the appended claims.

Having thus described my invention, what I claim is:

1. In an axial threshing and separating unit having a casing with a top and side wall means and a rotor extending longitudinally therein with a threshing and separating means and preceding auger flights axially aligned therewith for feeding crop material to said threshing and separating unit;
   ramp means extending across said casing below said auger flights and extending upwardly and rearwardly to feed crop material upwardly intermediately between said auger flights and said ramp for movement into said threshing and separating means and vane flights mounted on the inner surface of said top wall to direct crop material axially on rotation into said threshing and separating means.

2. In an axial flow threshing and separating unit as set forth in claim 1 wherein said casing has side plates and side vane flights are tilted in the same direction as said top vane flights to urge crop material rearwardly toward said threshing and separating means.

* * * * *